United States Patent [19]

Matrisian et al.

[11] Patent Number: 4,757,179
[45] Date of Patent: Jul. 12, 1988

[54] LASER WELDING METHOD

[75] Inventors: Robert M. Matrisian, New Cumberland; Joseph S. Svetina, Mechanicsburg; Kemper C. Walke, III, Harrisburg, all of Pa.

[73] Assignee: E. I. Du Pont de Nemours and Company, Wilmington, Del.

[21] Appl. No.: 4,197

[22] Filed: Jan. 16, 1987

[51] Int. Cl.$^4$ .............................................. B23K 26/00
[52] U.S. Cl. ............................. 219/121.64; 219/121.66
[58] Field of Search ................. 219/121 LC, 121 LD, 219/121 LE, 121 LF, 121 EF, 121 EG

[56] References Cited

U.S. PATENT DOCUMENTS

| 3,610,874 | 10/1971 | Gagliano | 219/121 |
| 4,341,942 | 7/1982 | Chaudhari et al. | 219/121 |
| 4,507,540 | 3/1985 | Hamasaki | 219/121 |

FOREIGN PATENT DOCUMENTS

| 0044746 | 3/1984 | Japan | 219/121 LC |
| 0107786 | 6/1984 | Japan | 219/121 LD |
| 0144587 | 8/1984 | Japan | 219/121 LD |
| 0210383 | 10/1985 | Japan | 219/121 LD |

Primary Examiner—C. L. Albritton

[57] ABSTRACT

A method to relieve peripheral stresses in molten pools of metal formed during laser welding by locating the molten pool with a portion of its periphery adjacent an open area.

4 Claims, 2 Drawing Sheets

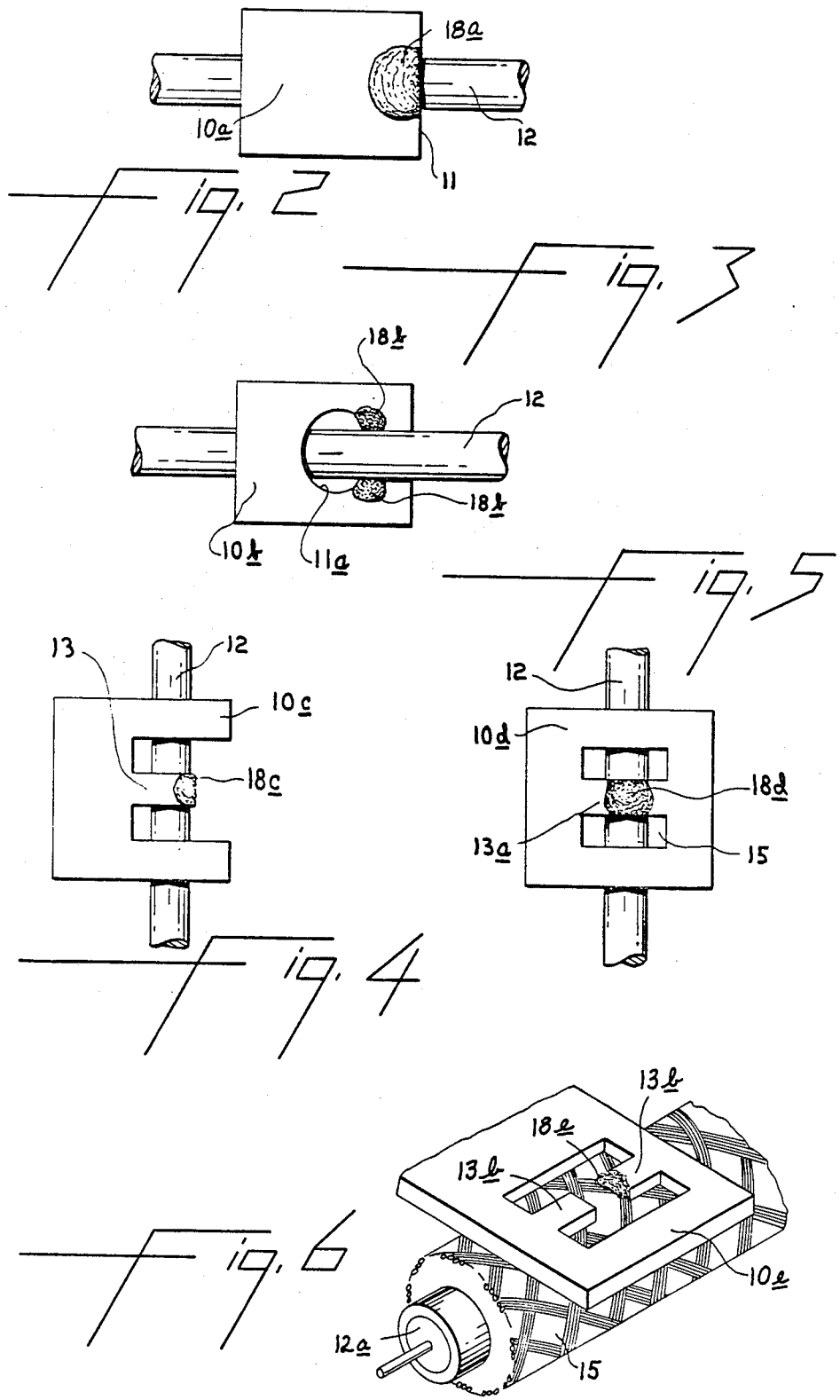

LASER WELDING METHOD

BACKGROUND OF THE INVENTION

This invention relates to bonding metallic elements with a laser beam.

It is known to bond two metal elements together by using an energy source, i.e., a laser beam, focused onto the surface of one of the elements and creating a molten pool of metal and as more laser energy is coupled into this pool, conduction causes the pool to enlarge until it contacts the other element to bond the two elements together. A problem occurring in making these bonds is the formation of cracks in the pool of metal as it cools and solidifies. Cracks serve as sites of localized corrosion and may propogate causing the bond or weld to fail. Cracking occurs with metals that are prone to crack if the pool is constrained throughout its periphery by the metallic element in which the pool is first formed. Peripheral stresses cause the pool to tear along liquid boundaries when it is in the two-phase state.

SUMMARY OF THE INVENTION

A method to relieve these stresses and reduce cracking has now been found which includes the step of forming the element in which the pool is initially formed with an open area adjacent to a portion of the periphery of the molten pool created by the laser beam whereby the molten pool is unconstrained in that portion of its periphery and is free to shrink therefrom without creating peripheral stresses and subsequent cracking as the molten pool solidifies.

BRIEF DESCRIPTION OF THE DRAWINGS

FIGS. 2-6 are views of other arrangements of the metal terminal and conductor wire which are also in accordance with a method of this invention.

DETAILED DESCRIPTION OF THE PREFERRED EMBODIMENT

Figure 1:
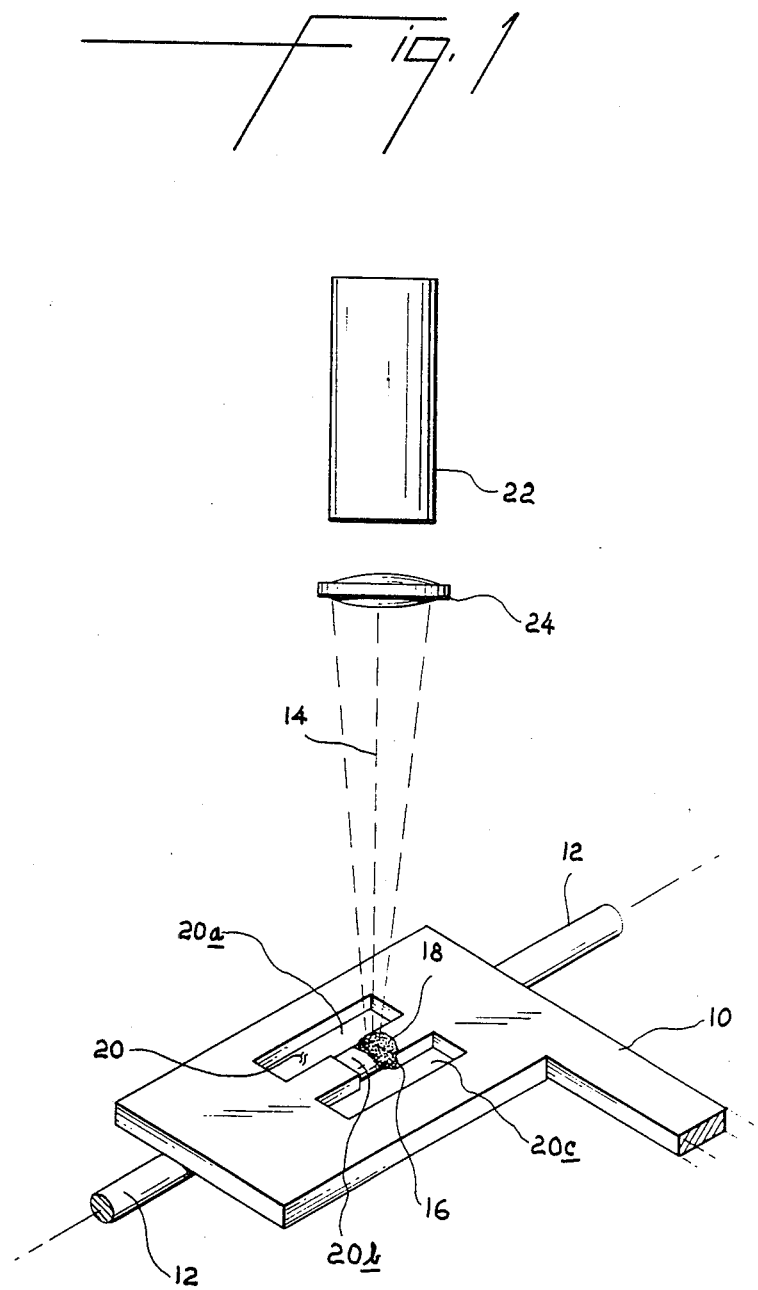
FIG. 1 is a perspective view of a conductor wire being bonded to a metal terminal by a laser beam in accordance with a method of this invention.

Referring now to FIG. 1, the embodiment chosen for purposes of illustration includes a first element in the form of a metal terminal 10 and a second element in the form of conductive wire 12 being bonded together by means of a laser beam 14. A bond is formed by directing the laser beam 14 to the surface of metal terminal 10 at a location 16 to create a molten pool of metal indicated by the numeral 18. The metal terminal 10 is preferably formed of phos-bronze terminal material, 0.012 inches thick flush plated with nickel to enhance its absorbtivity to the laser beam 14 which has a 1064 nm wavelength. The terminal 10 is punched in a die and has a H-shaped opening 20 formed therein so that the opening 20 provides an open area that is adjacent to a portion of the periphery of the molten pool of metal 18 created by the laser beam 14 which originates from source 22 and is focused through lens 24. The wire 12 is 0.016 inch diameter copper with a tin plating.

In operation, a bond or weld between terminal 10 and wire 12 is created by directing laser beam 14 to the surface of terminal 10 to form a molten pool of metal 18 which is bounded in a portion of its periphery by the open area 20a, 20b and 20c of H-shaped opening 20 whereby the molten pool of metal is unconstrained in that portion of its periphery and free to shrink from this portion without creating peripheral stresses and subsequent cracking as the molten metal cools and solidifies.

In the embodiment shown in FIG. 2 the molten pool of metal 18a is formed at an edge 11 of the metal terminal or first element 10a which is contiguous to wire 12.

FIG. 3 shows an embodiment wherein the edge 11a is formed internal of metal terminal or first element 10b and two molten pools of metal 18b are formed along the edge 11a.

FIG. 4 shows a molten pool of metal 18c formed at the end of the central leg 13 of an E-shaped metal terminal or first element 10c which is contiguous to wire 12; FIG. 5 shows a molten pool of metal 18d formed on a bridge 13a across a central opening 15 in metal terminal or first element 10d; and FIG. 6 shows molten pools of metal 18e formed at the ends of legs 13b of metal terminal 10e which is proximate to braided copper shielding 15 of cable 12a.

In each of the embodiments of FIGS. 2-6 by unconstraining a portion of the periphery of the molten pools of metal, the molten pool is free to shrink from this portion without creating peripheral stresses and subsequent cracking as the molten metal solidifies.

We claim:

1. In a method of bonding a first metallic element having upper and lower substantially flat surfaces, to a second metallic element contacting said lower surface including the steps of directing an energy source onto a location on the upper surface of the first element to create a molten pool of metal constrained throughout its periphery by the first element and enlarging said pool until it contacts the second element to bond the first and second elements, the improvement comprising: forming said first element at said location with an open area that is adjacent a portion of the periphery of the molten pool of metal whereby the molten pool is unconstrained in said portion of its periphery and free to shrink from this portion without creating peripheral stresses followed by cracking as the molten pool of metal solidifies.

2. The method as defined in claim 1 wherein said energy source is a laser beam.

3. The method as defined in claim 1 wherein said first element is a metal tab and the other of said elements is a wire.

4. The method as defined in claim 1 wherein said first element is a metal tab and the other of said elements is a braided shielding for a cable.

* * * * *